United States Patent
Clot

Patent Number: 5,255,245
Date of Patent: Oct. 19, 1993

[54] TOTAL FIELD IMAGING PROBE

[76] Inventor: Andre Clot, Clos Maronniers, Simiane, France, 13109

[21] Appl. No.: 828,912
[22] PCT Filed: Jul. 27, 1990
[86] PCT No.: PCT/FR90/00574
§ 371 Date: Jan. 29, 1992
§ 102(e) Date: Jan. 29, 1992
[87] PCT Pub. No.: WO91/02269
PCT Pub. Date: Feb. 21, 1991

[30] Foreign Application Priority Data

Aug. 1, 1989 [FR] France ................. 89 10582

[51] Int. Cl.⁵ .................................... G01V 1/40
[52] U.S. Cl. ........................ 367/25; 367/911; 324/366; 181/102
[58] Field of Search ................. 367/25, 86, 911; 181/102, 104; 175/50; 166/250, 206, 179; 324/347, 323, 366; 73/152, 151

[56] References Cited

U.S. PATENT DOCUMENTS

| | | | |
|---|---|---|---|
| 2,930,969 | 3/1960 | Baker | 324/347 |
| 4,236,113 | 11/1980 | Wiley | 324/366 |
| 4,862,090 | 8/1989 | Vannier et al. | 324/367 |
| 4,899,320 | 2/1990 | Hearn et al. | 73/151 |

FOREIGN PATENT DOCUMENTS 2448621 9/1980 France .

Primary Examiner—Ian J. Lobo
Attorney, Agent, or Firm—Ladas & Parry

[57] ABSTRACT

The invention relates to the principle of a probe to improve the quality of imaging logs in excavations, providing especially a good coverage of the wall 2 of the excavation by the beam of sensors 4 or electrodes. The basic component is constituted by a casing 6 moulded from a material of the elastomer type and made to allow it to be unfolded in the working position for the helically implanted zones of measurements 7, and applied against the wall 2.

The material of the zones 7 of measurements is selected as a function of the parameter to be measured, the immediate but non-limiting applications concerning microresistive and acoustic imaging.

The helical arrangement of the sensors 4 improves the coverage of the measurements with respect to conventional probes. Moreover, by eliminating the drilling mud 3 between the sensors 4 and the formation, this probe improves, in certain cases such as acoustic imaging for example, the response thereof and the quality of the measurements.

10 Claims, 3 Drawing Sheets

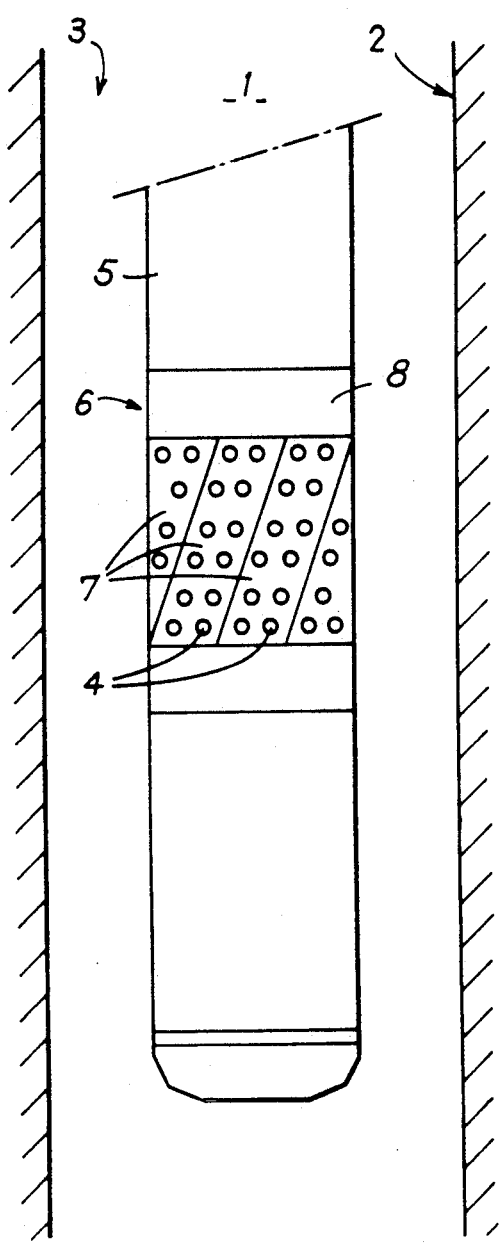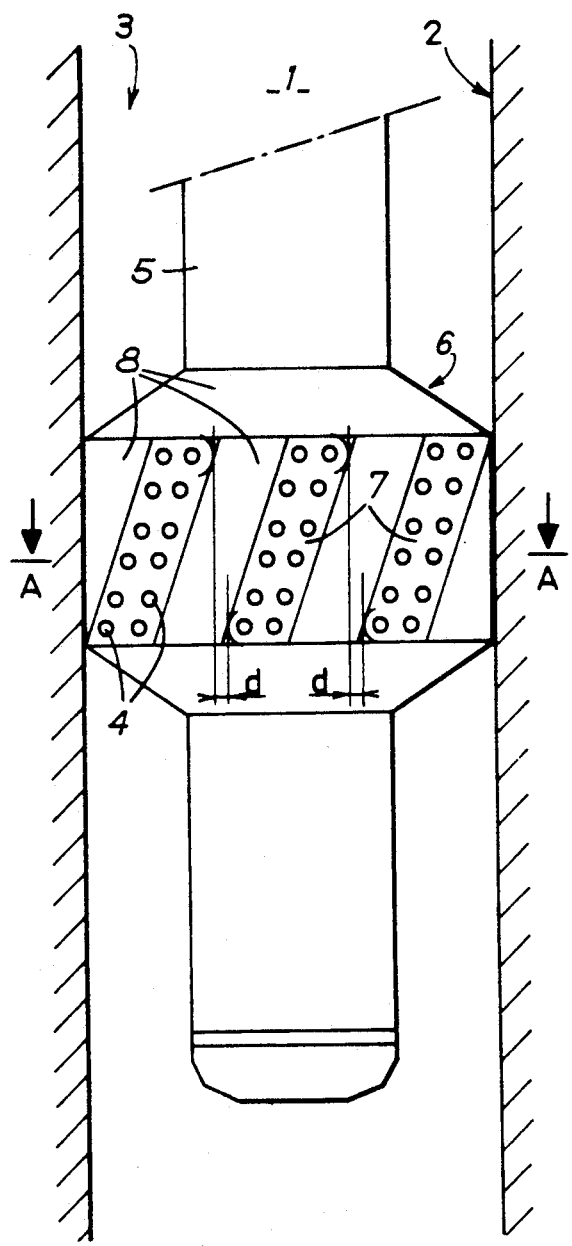

TOTAL FIELD IMAGING PROBE

BACKGROUND OF THE INVENTION

The present invention has for its object a total field imaging probe enabling logs to be made over the whole periphery of the wall of a hole excavated in the sub-soil.

The technical sector of the invention is the manufacture and exploitation in situ of tools or probes for making measurements of the characteristics of the soil in a bore-hole traversing geological formations and for remotely reading and analyzing these measurements.

One of the principal applications of the invention is the use thereof for effecting imaging logs of wells making it possible to obtain a good coverage of the whole of the excavation, using different conventional individual measuring means, such as acoustic or microresistive measurements.

In fact, different systems and processes are known, of which certain have formed the subject matter of Patent Applications and which relate to the same object and/or the same application as the present invention, but of which the technical solutions retained do not allow good performances and/or are difficult to implement.

In the following description and by way of definition, the generic term "electrical logging" or "log" designates the continuous recording of physical parameters of the formations encountered during excavation, as a function of the depth.

It will firstly be recalled that imaging logging is a novel concept making it possible, from conventional individual measurements, to present along an evolute of the wall of the borehole as a function of the depth, the response of this wall to a physical measurement, such measurement having a vertical and horizontal definition of the order of several tens of centimeters for usual logs.

This representation, on any displayable visual support and, furthermore, oriented in space, therefore constitutes an artificial image of the formations encountered. Implementation thereof essentially necessitates:

an investigation with the aid of the parameter measured, allowing the maximum coverage of the wall of the well;

means for locating in space;

a processing of each measurement representing the amplitude of this parameter in the form of a colour or a gradual range of greys; for example, the high resistivities in white and the very low in black. The amplitude of a sound wave, emitted by a sensor, after reflection by the wall of the well, may be processed in the same manner.

DESCRIPTION OF RELATED ART

For example, Patent FR 2 532 059 filed on Aug. 19, 1982 by the firm SCHLUMBERGER PROSPECTION ELECTRIQUE, describes a device for the visual presentation of results of measurement, applicable to this type of processing.

It is obvious that, in order to be representative of the formations encountered, these measurements must investigate a maximum percentage of the wall of the well.

To that end, one possibility is to effect an acoustic imaging from a rotating sensor serving as emitter and receiver, and mechanically posing no problems. The density of the data received depends only on controllable parameters:

speed of rotation;
ascensional speed;
number of scans per revolution.

This applies to any other measurement made from a rotating sensor, such as for example the one described in Patent Application FR 2 448 621 filed on Sep. 2, 1979 by the INSTITUT FRANCAIS DU PETROLE and entitled: "Probe with rotating shoe for effecting measurements in a borehole".

On the other hand, any measurement necessitating the contacting of sensors or of shoes on the wall of a well poses mechanical problems recalled hereinafter.

In fact, in order to produce this contact, the probes usually use rigid or semi-rigid shoes constituting one side of a parallelogram, the opposite side being defined at its ends by one or two articulations located on the body of the probe, as described for an acoustic imaging in U.S. patent application Ser. No. 948 206 filed on Dec. 31, 1986 by the firm SHELL INTERNATIONAL RESEARCH.

The coverage of the measurement depends on the size of the shoes, their number and the diameter of the excavation. Furthermore, the descent of tool in the well, before the measurement, imposes that, in rest position, with shoes folded, the latter are contained within the diameter of the probe body and, in the acoustic use hereinabove, the friction of the shoes on the wall generates many parasitic noises.

Within the framework of a current application, the coverage of a probe with an outer diameter of $4\frac{1}{2}''$, for example in a hole of $8\frac{1}{2}''$ (petroleum standards respectively equivalent to 114.3 mm and 216 mm), does not exceed 40%; it is no more than 28% in a well of $12\frac{1}{4}''$ (311 mm).

This servitude obliges the operators to make several recordings in order that the tool, having if possible rotated between two measurements, obtains a sufficient coverage of the wall.

In the domain of imaging for probes with electrodes of microresistivity, U.S. patent application Ser. No. 2 611 919 filed on Mar. 5, 1987 by the firm PROSPECTION ELECTRIQUE SCHLUMBERGER is noted, concerning a logging probe with wide angular field: this probe makes it possible to double the coverage of the usual mechanical probe by allowing the implantation, at the end of each articulated arm, of two lateral flaps for measurement disposed on either side of an axis parallel to the axis of the probe and offset in height, in order to be able to position them on the probe body.

Such implantation theoretically makes it possible to obtain 100% of coverage in a well of 7" (non standard in open hole) and only 82% in $8\frac{1}{2}''$ with a probe whose outer diameter is 5". This, furthermore, leads to complex, and consequently expensive, mechanics.

Another possibility for effecting a total field imaging, limiting the mechanical problems, is to effect said imaging from a probe not touching the wall of the hole to be explored: however, the measurements collected are automatically disturbed by the fluid, which is often mud, filling this hole and introduced between the sensors and the wall: the results are then difficult to interpret as, whether in the electrical or acoustic domain, the fluids used may constitute a parasitic element: in acoustics, the solid microparticles present in the mud diffract the sound wave and considerably reduce the amplitude of the wave received by the sensor; in electrics, the low resistivity of the mud promotes a partial short-circuit of the lines of current at the output of the electrodes.

Various studies have, of course, been noted, which have formed the subject matter of Patent filings in order to limit these problems associated with the influence of the fluid, both in electrics and in acoustics, such as:

FR Patent Application 2 611 920 filed on Feb. 25, 1987 by the CNRS, which employs electric electrodes for detecting fractures located in a ring at the center of the probe and associated with focussing and collecting electrodes at the ends with correction means adapted to act on the potential of the emission electrodes in order to compensate the diffusion of the current in the fluid medium; in a variant, the protection and emission electrodes have a movement of rotation about a vertical axis of the probe.

U.S. patent application Ser. No. 935 422 filed on Nov. 26, 1986 by the firm SHELL INTERNATIONAL RESEARCH, which describes an apparatus for producing images of probe holes, with acoustic transducer, and comprising adjustable variable gain amplification means in order to reduce the effects of false signals generated by the mud located in a ring around the probe.

Apart from the problems, which are therefore of parasitical influence, of the introduced fluid which, despite the above projects, are not solved in order to obtain a good interpretation of the measurements, it is necessary also to emphasize the difficulty of positioning the probes and of controlling their orientation since there is no bearing against the walls; this renders still more difficult implementation thereof in order to have a reading of the wall which is as complete as possible.

A last possibility, on the one hand, for reducing the influence of the fluid of the above systems and, on the other hand, for simplifying the mechanical means of the preceding ones, is to use probes with supple wall, which may then be applied against the wall; this possibility has been developed in various applications, all with electrodes, of which the following two examples which have formed the subject matter of Patent filings may be mentioned: U.S. Pat. No. 2 930 969 filed on May 16, 1956 by Mr. BAKER, describes a supple casing open upwardly and downwardly, like a floating anchor, and bearing electrodes on its outer surface, so that, hooked to a handling rod, it closes when it is descended in the well and it opens by the speed of the fluid, penetrating in its upper part when it is raised.

Another U.S. Pat. No. 4 236 113 filed on Apr. 13, 1978 by Mr. WILEY for PHILIPS PETROLEUM, describes a probe comprising an inflatable body, on which are disposed electrodes in a horizontal plane and which comes into contact with the wall when the probe is positioned in the desired place.

These systems effectively make it possible to reduce the mechanical complexity of the articulated shoes, but do not solve the lack of total coverage of the wall of the well; moreover, the first system requires a high speed of rise of the probe and the second, on the contrary, the taking of a measurement when stopped, as it then totally obturates said well.

Thus, none of these processes or devices makes it possible to solve the problem to which the present invention brings, however, solutions: in fact, the problem raised is that of being able to produce a probe allowing a total field imaging of the sub-soil surrounding a hole, which improves the performances of the present tools, on the one hand in the effectively total coverage of the periphery of the wall up to diameters of at least 216 mm and even beyond, with a definition of vertical and horizontal measurement of the order of a centimeter, over the whole surface of the wall, on the other hand, in the maximum elimination of the parasitic effects of the fluid medium existing in the hole and, finally, allowing its rise during measurement, limiting the possible vibrations due to the frictions and despite the presence of the ambient fluid medium, which must therefore circulate on either side of the probe.

SUMMARY OF THE INVENTION

One solution to the problem raised is a total field imaging probe for effecting imaging loggings over the whole periphery of the wall of a hole bored in the sub-soil and filled with a fluid, because of sensors for measuring the characteristics of this soil, mounted on or in the body of said probe, certain parts of this body being able to come into contact with said wall and in rest position, its outer shape being that of a cylinder with a diameter smaller than the diameter of said hole: according to the invention, said body of the probe comprises at least one casing moulded from a material of elastomer type, comprising helical elements, separated by bellows, with the result that, thanks to any internal expansion means, said casing unfolds so that said elements follow the shape of the wall of the well and that said bellows ensure the connections between these elements and maintain the assembly of the casing in semi-rigid manner following a continuity of its peripheral face.

In different embodiments, said casing may be completely closed and contains a fluid which may be placed under pressure in order to constitute said internal expansion means of the casing against the wall of the well, said helical elements being provided with appropriate elastic return systems to return into rest position in the absence of relative pressure of the fluid greater than that of the ambient fluid and said bellows leave a sufficient passage for said fluid during the rise of the probe during measurement; or said internal expansion means is constituted by any hydromechanical system connecting each helical element to a static structure element of the probe body.

In an application of acoustic measurement, at least one of the sensors is an ultrasonic transducer, located inside said probe, said casing being completely closed and filled with a fluid allowing a good acoustic coupling.

In another application of electrical measurement, possibly combined with the preceding one, at least certain of said sensors are known microresistive measurement electrodes integrated and moulded in said helical elements able to come into contact with said wall of the well, and disposed along these elements in order that, whatever the diameter of the position of expansion and of measurement compatible with said probe, the whole of the periphery of the wall of said well is entirely covered and investigated by said electrodes, when said probe is raised without rotation.

Other different applications of measurements are also possible.

The result is a novel total field imaging probe which considerably improves the performances of the present tools and opens up the possibility of numerous uses. In fact, because of the combination of helical elements which may come into contact with the wall of the hole or of the well, and of bellows inserted between these elements, the assembly constituting a semi-rigid body which may therefore well support the effects of friction against the wall, it is possible to adapt all types of known sensors usable for loggings; these technical solutions proposed are even more interesting when these sensors necessitate a good contact with the formation of the sub-soil to be investigated.

This probe according to the invention, in fact, solves in priority the problem of coverage of the wall of the well or of measurements of microresistivity or any measurement using sensors in contact with this wall. However, the principle of this probe also allows applications and/or improvements for other methods of imaging loggings, such as those described by way of example and in greater detail in the following description and concerning:

acoustic imaging, as the probe makes it possible to overcome the servitude due to the quality of the mud and considerably to reduce the incidence of the others (contrasts of the acoustic impedances, etc. . . );

the combination with the electrical imaging of an acoustic system also allowing the exact measurement of the geometry of the hole;

the problem of the well camera in an opaque medium, such as the drilling mud, which generally prevents use thereof apart from water and low-energy geothermic boreholes.

Another advantage, and not the least, whatever the application of this probe, is that the latter, being given its principle and the materials used for making it, is extremely light compared with conventional probes.

In terms of measurement, this means:

better application of the elements and therefore of the measuring segments when these elements bear sensors;

better centering of the probe in deviated wells;

reduction of the "YO-YO" effect of the probe, which is a non-linear displacement due to a variable effort of friction and which is encountered in the systems comprising shoes.

Other advantages of the present invention may be mentioned, but those cited above already show sufficient to demonstrate the novelty and interest.

BRIEF DESCRIPTION OF THE DRAWINGS

The description, drawings and Figures hereinafter represent an embodiment of the invention, but have no limiting character; other embodiments are possible from the Claims which specify the scope and extent of this invention.

FIG. 1 is a side view of an embodiment of probe according to the invention in rest position penetrating in a hole.

FIG. 2 is a side view of the probe of FIG. 1 in position for measurement.

DETAILED DESCRIPTION

Figure 3:
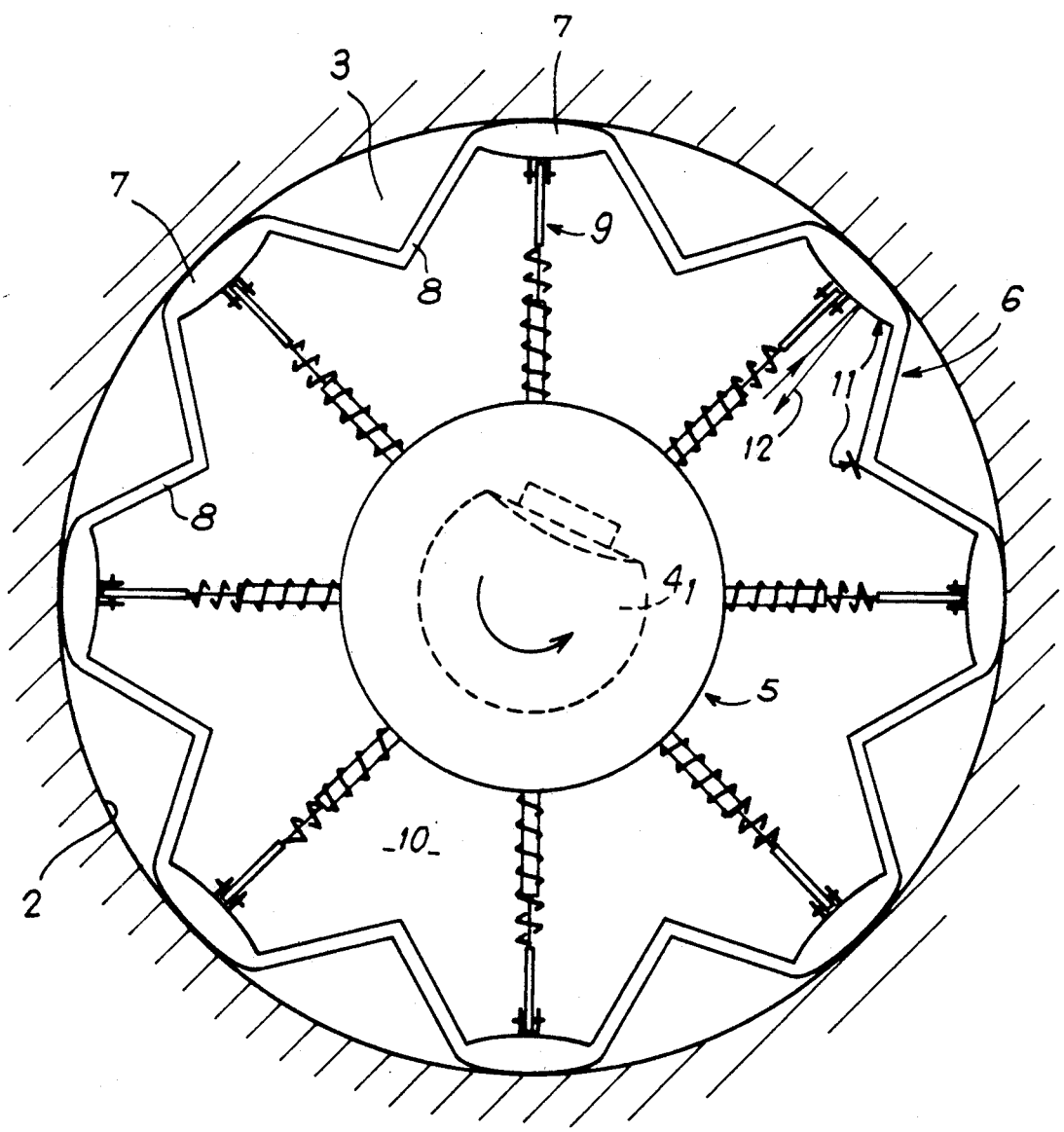
FIG. 3 is a view in section along AA in FIG. 2 of a probe in position for measurement.

The present invention concerns the probe itself, its principle of unfolding and of production and in no way the electronics associated with the different measurements which have already been developed for this type of applications and which are therefore not described.

In its rest, or folded, position, as shown in FIG. 1, the probe 5 may be displaced in the bored hole 1, its outer shape being that of a diameter less than that of said hole 1. The latter is generally filled with fluid 3 which, in the case of a borehole underway, is opaque mud, and which therefore separates the wall 2 of the hole from the probe body 5; this fluid must be able to pass from one side of the probe to the other when the latter is unfolded as in FIG. 2 and displaced linearly during measurement.

Said probe body 5 comprises according to the invention a casing 6, moulded from a material of elastomer type, resistant to abrasion, oils, heat, etc. . . This casing comprises helical elements 7 which, when they are in rest position, are virtually adjacent one another: these elements 7 may comprise, for the applications of measurement necessitating contact with wall 2, sensors 4 such as electrodes or transducers, which are then distributed helically over said casing 6.

In that case, it may be envisaged to cover simply zones 7 in direct contact with the wall of the well during the unfolding, apart from the sensors, with a small thickness of material which particularly resists abrasion, without being detrimental to the necessary suppleness. The assembly of the electrodes or transducers may be moulded in the material of the probe body, in accordance with well known techniques which are used elsewhere.

In a variant, the material of the electrodes may be elastomer or like conductive material.

FIG. 2 shows the same probe 5 in position for measurement, as a result of expansion and unfolding of its casing 6 against said wall 2 of the well or hole 1.

The radial elasticity, necessary for unfolding, is obtained via bellows 8 which may be disposed in accordance with FIG. 3. Furthermore, when the casing 6 is tight and closed, the section available between these bellows 8 and the wall of the well 2 allows passage of the fluid such as the drilling mud 10, during rise of the probe 5 in the course of measurement.

Whatever the expansion adapted to the diameter of the hole 2, said expansion makes it possible, up to a maximum diameter of the wall which is set and particular to each type of probe, to ensure a coverage "d" of measurements between the sensor 4 located at the top of an element 7 and that located at the bottom of the adjacent element, during the rise of the probe. Depending on the desired precision and the definition of the measurement, there will be set a negative minimum value of "d" in order to have a guaranteed surface coverage for the two sensors and a positive minimum value when a tolerance of non-coverage is accepted.

The upper and lower parts of the zones of measurement of the casing 6 may be protected in order to avoid the probe hooking on descending or, in the course of measurement, on rising. This protection may be obtained, for example by a system of "petals" which overlap more or less as a function of the diameter.

In a preferred embodiment of the invention, unfolding takes place by placing under pressure a fluid 10 inside the tight casing 6, which must then be closed, completely closed and tight, controlled by a mechanical return system 9 to return into rest position in the absence of relative pressure of the fluid 10, ensuring for the helical elements 7 a known geometry as a function of the outer diameter of the cylinder on which these elements are positioned and which corresponds, in position of measurement, to that of said hole 1, as shown in FIG. 3.

In another embodiment, said internal expansion means 9 is constituted by any hydromechanical system connecting each helical element 7 to a static structure element of the probe body 5; this hydromechanical system may be constituted by jacks and springs.

According to another embodiment, the casing 6 comprises a double wall, of which the space thus defined may be placed under pressure in order to ensure greater rigidity.

Thus, said casing 6 and its internal expansion means 9 may be made in accordance with one of the forms described hereinabove or may combine several of these forms, such that:

either the casing 6 is closed and tight, and may be unfolded by a fluid under pressure;

the casing 6 is closed and tight and may be unfolded by an internal mechanical or hydromechanical means 9 enclosed in said casing, which may then be filled with a liquid 10 then remaining under equal pressure with the outside atmosphere 3;

the casing 6 is open upwardly and downwardly and articulated arms 13 ensure unfolding thereof, or any other mechanical or hydromechanical means;

or the envelope is as in the preceding case and comprises, in addition, a double wall to render it more rigid.

FIGS. 1 and 2 illustrate forms in accordance with the first two examples mentioned hereinabove. The casing 6 protects all of the internal volume thus defined from the drilling mud. This implies that the upper and lower openings of this casing are tight on the corresponding parts of the body of the probe 5.

Figure 4:
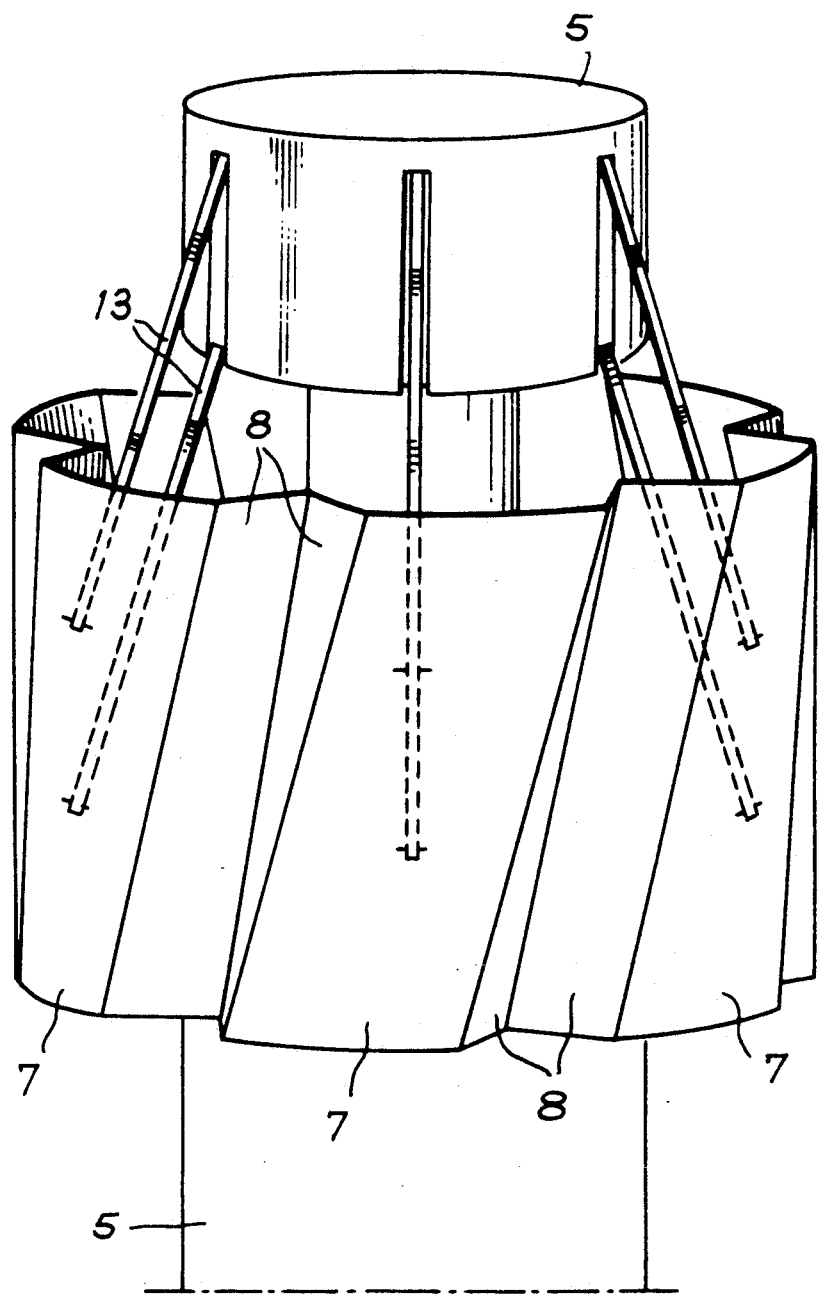
FIG. 4 is a perspective view of another embodiment of probe.

However, the two basic characteristics which are that of having a support on the one hand, ensuring a helical distribution of segment able to bear sensors and, on the other hand, presenting a capacity of radial unfolding, because of the presence of bellows between the zones of measurement, may also be ensured without necessitating a closed tight casing on the probe body; this latter possibility is shown in FIG. 4, in illustration of the forms in accordance with the latter two examples cited above.

In this Figure are found again: the segments 7 with helically implanted zones of measurement and the bellows 8.

In the case shown, articulated arms 13 ensure unfolding from the support or probe body 5; the electrodes and the assembly of the necessary electrical connections may be moulded in the casing 6 at the level of the zones of measurements.

In a variant, therefore, the casing 6 may be of double thickness and hollow, the interior being filled with a hydraulic fluid under equal pressure in rest position, and in slight overpressure during the measurements with the ambient fluid, the overall geometry of the system remaining identical.

One of the objectives envisaged by this latter variant is that of introducing a variable rigidity at the level of the zones of measurement and of being able to modify the radius of curvature thereof by increasing the pressure inside, so as to be adapted to the variations of the diameter of the borehole.

In this variant, the bellows 8 are not hollow but some tubular passages of small diameter made in the thickness of the bellows ensure hydraulic continuity between the different zones of measurements.

The electrical connections between the electronics inside the probe 5 and the electrodes pass behind the unfolding arms 13 and penetrate in the probe via tight connectors.

The same applies to the hydraulic connections in the case of hollow zones of measurements 7.

The probe comprises mechanical means 9 necessary for regular folding, such as described hereinabove; any other solution is possible, such as, for example, a spring system mounted on the inner edge of the bellows 8. This return assembly between the bellows and the static inner part of the probe 5 allows a position of equilibrium of the bellows between this return tension and the pressure differential existing between the interior of the probe and the well, in the closed casing and inner fluid under pressure version.

The helical elements 7, which may therefore be for measurement, may be made of one or more segments as a function of the unfolding to be obtained, the only servitude being that of knowing at any moment the geometry of these measuring elements as a function of the unfolded diameter.

The theoretical calculation of coverage takes into account an ascending linear displacement of the probe 5, without rotation of the latter in the borehole, which is rarely the case.

The strains governing this problem of rotation have two origins:

strain existing between the two layers of strands in the cable ensuring mechanical connection for handling and transmission of the measurements towards the surface;

strain due to the helical elements themselves and tending, in the absence of opposing force, to rotate the probe following their own pitch.

If the latter effect is preponderant, likewise helical recesses having a pitch in a direction opposite that of the helix may be moulded between the zones of measurement in order to oppose this action.

Determination of the diameter may be made in several ways, depending on the degree of precision desired:

with the well known technique using an internal potentiometer along a diameter, of which the slide moves as a function of the unfolding of the diameter;

by measuring the time of passage of an acoustic wave emitted by a sensor $4_1$, which in that case is an ultrasonic transducer $4_1$ located inside said probe 5, said casing 6 being completely closed and filled with a fluid 10 allowing a good acoustic coupling.

At least one or some acoustic reflectors are placed regularly, when there are several, inside the elements 7 of the probe and, because of said acoustic sensor $4_1$, in that case turning and rotative, when there are several, and of which the wave 12 is reflected by each of these reflectors 11, enable the geometry of the hole 1 to be perfectly known.

In fact, the speed of sound in the fluid within the probe being perfectly known, as well as the thickness of material between the wall of the well and the inner surface of the reflector, the radius may be determined permanently.

This technique with respect to the use of the wave reflected by the wall makes it possible to obtain a much greater amplitude which, furthermore, is independent of the lithology.

In another embodiment, said acoustic reflectors 11 are located at the intersection of each half-bellows 8 and oriented so that, whatever the unfolding, the perpendiculars to the planes of these reflectors pass through the acoustic sensor $4_1$, of which the wave 12 reflected by each of the reflectors always enables the geometry of the hole 1 to be known.

As stated previously, the geometry of the probe being known as a function of the diameter, the position of the sensors 4 such as electrodes or transducers with respect to fixed references of the probe, is permanently known.

The position of the probe in space is known because of a navigation module constituted for example by a three-axis accelerometer and a three-axis magnetometer or a three-axis gyrometer, of which the principles and use are perfectly well known.

In the acoustic imaging effected in the configuration described previously, but for example beneath or outside of the acoustic reflectors in order to know and investigate directly the wall 2 of the well, the path of the acoustic wave is as follows:

passage in the fluid 10 of the probe body 5;
passage through the sheath of the casing 6;
passage in the drilling fluid 3;
reflection on wall 2;
passage in the drilling fluid 3;
passage through the sheath of the casing 6;
passage in the fluid of the probe body 10;
detection by the sensor $4_1$.

The amplitude of the wave reflected and detected by the sensor may be altered by different parameters:

contrasts between the various acoustic impedances of the materials or fluid traversed: fluid of the probe/casing, casing/drilling fluid, etc...;

density of the mud and particularly presence of solid microparticles which contribute in preponderant manner to the weakening of the acoustic signal;

excentering of the tool in the hole.

The use of a probe similar in the principle of unfolding to that described previously but using, as internal fluid 10 and as material of the helical sectors 7, constituents chosen in particular by reason of their appropriate acoustic impedance, makes it possible to overcome the constraint due to the quality of the mud and considerably to reduce the incidence of the others.

The incidence of the excentering of the probe on the measurement of amplitude being able to be calculated, the measurement of the position of the probe according to the principle explained previously makes it possible, after processing on the surface of the measurement by the corresponding algorithm, to restore the corrected amplitude.

In that case, nothing, apart from the density of information to be raised to the surface, prevents different imaging measurements, for example acoustic and microresistive, to be coupled on the same probe; said probe is in that case constituted by at least two casings 6 placed one above the other and able to comprise elements 7 and sensors 4 of characteristics different from one another in order to be able to make different types of measurement. The general geometry of the probe remains unchanged, the upper part being reserved for one type of measurement, the lower part for another, and so on, if there are several.

Finally, this probe may include a camera: in that case, the material of the elements 7 is transparent, said casing 6 being completely closed and filled with a fluid allowing a good optical coupling, one of said sensors 4 placed in the casing such as for example acoustic sensor 4, shown in FIG. 3, being a well camera which may allow observation even in the presence of opaque mud.

The "CCD" well camera, of which the technique is well known, may be oriented radially about 360° of freedom, its axis of rotation being axially displaceable in order to be able to investigate over the whole height of the window defined by that of the transparent elements.

This type of measurement is generally effected in stationary manner and the probe is folded between each station. Cleaning of the walls with the aid of appropriate scrapers with the boring rods, may be effected before the measurements.

I claim:

1. Total field imaging probe for effecting imaging logs over the whole periphery of the wall of a hole bored in the sub-soil and filled with a fluid said probe including sensors for measuring the characteristics of this soil mounted on or in the body of said probe, certain parts of said body being able to come into contact with said wall and, in the rest position, having an outer shape of a cylinder and a diameter smaller than the diameter of said hole, said body of the probe comprising: at least one casing molded from a material of elastomer type, said casing comprising helical elements separated by bellows responsive to internal expansion means for unfolding said casing whereby said elements follow the shape of the wall of the well, said bellows ensuring the connections between the elements and maintaining the assembly of the casing in semi-rigid manner for following a peripheral surface continuity.

2. Total field imaging probe according to claim 1, wherein said casing is completely closed and contains a fluid which may be placed under pressure, in order to constitute said internal means for expanding the casing against the wall of the well, said helical elements being provided with appropriate elastic return systems for returning to a rest position in the absence of relative pressure of the fluid greater than that of ambient fluid and said bellows leave a sufficient passage for said fluid during the raising of the probe in the course of measurement.

3. Total field imaging probe according to claim 1, wherein said internal expansion means is constituted by any hydromechanical system connecting each helical element to a static structure element of the probe body.

4. Total field imaging probe according to claim 3, wherein the casing comprises a double wall, of which the space thus defined may be placed under pressure to ensure a greater rigidity.

5. Total field imaging probe according to claim 1, wherein at least certain f said sensors are known microresistive measurement electrodes integrated and moulded in said helical elements which may come into contact with said wall of the well, and disposed along these elements so that, whatever the diameter of the position of expansion and of measurement compatible with said probe, the whole of the periphery of the wall of said well is entirely covered and investigated by said electrodes, when said probe is raised without rotation.

6. Total field imaging probe according to claim 1, wherein at least one of said sensors is an ultrasonic transducer, located inside said probe, said casing being completely closed and filled with a fluid allowing a good acoustic coupling.

7. Total field imaging probe according to claim 6, wherein acoustic reflectors are placed in regular manner inside the elements of the probe for determining the geometry of the hole when said casing is rotating by measuring acoustic waves reflected from said reflectors to said acoustic sensor.

8. Probe according to claim 6, wherein acoustic reflectors are located at the intersection of half-bellows and oriented for directing lines perpendicular to the planes of these reflectors to pass through the acoustic sensor, the wave reflected by each of the reflectors enabling the geometry of the hole to be known.

9. Probe according to claim 1, wherein the material of the elements is transparent, said casing being completely closed and filled with a fluid allowing a good optical coupling, one of said sensors being a well camera which may allow observation even in the presence of opaque mud.

10. Total field imaging probe according to claim 1, wherein it is constituted by at least two casings placed one above the other and able to comprise elements and sensors of characteristics different from one another in order to be able to effect different types of measurement.

* * * * *